(12) United States Patent
Lakk

(10) Patent No.: US 10,511,447 B1
(45) Date of Patent: Dec. 17, 2019

(54) SYSTEM AND METHOD FOR GENERATING ONE-TIME DATA SIGNATURES

(71) Applicant: Guardtime IP Holdings Ltd., Tortola (VG)

(72) Inventor: Henri Lakk, Tartu (EE)

(73) Assignee: Guardtime SA, Lausanne (CH)

( * ) Notice: Subject to any disclaimer, the term of this patent is extended or adjusted under 35 U.S.C. 154(b) by 0 days.

(21) Appl. No.: 16/143,244

(22) Filed: Sep. 26, 2018

(51) Int. Cl.
- *H04L 29/06* (2006.01)
- *H04L 9/32* (2006.01)
- *H04L 9/08* (2006.01)
- *H04L 9/30* (2006.01)

(52) U.S. Cl.
CPC .......... *H04L 9/3247* (2013.01); *H04L 9/0869* (2013.01); *H04L 9/30* (2013.01); *H04L 9/3297* (2013.01)

(58) Field of Classification Search
CPC ....... H04L 9/3247; H04L 9/0869; H04L 9/30; H04L 9/3297
See application file for complete search history.

(56) References Cited

U.S. PATENT DOCUMENTS

| | | | | |
|---|---|---|---|---|
| 7,490,241 B1 * | 2/2009 | Peyravian | ............. | H04L 9/3297 705/50 |
| 9,608,813 B1 * | 3/2017 | Roth | ....... | H04L 9/0894 |
| 9,614,682 B2 * | 4/2017 | Buldas | ............. | H04L 9/3247 |
| 9,866,393 B1 * | 1/2018 | Rush | ...................... | H04L 9/3247 |
| 10,110,385 B1 * | 10/2018 | Rush | ...................... | H04L 9/3247 |
| 2003/0056100 A1 * | 3/2003 | Beatson | ............. | G07C 9/00063 713/176 |
| 2007/0028106 A1 * | 2/2007 | Lauter | ................... | H04L 9/0844 713/171 |
| 2014/0192981 A1 * | 7/2014 | Hiwatari | ............... | H04L 9/3093 380/46 |
| 2015/0350197 A1 * | 12/2015 | Ike | ........................ | H04L 63/126 713/156 |
| 2016/0094991 A1 * | 3/2016 | Powell | ................... | G06Q 20/32 455/411 |
| 2016/0323741 A1 * | 11/2016 | Lee | ........................ | H04W 12/06 |
| 2018/0152297 A1 * | 5/2018 | Fielding | ................ | H04L 9/0866 |
| 2018/0227131 A1 * | 8/2018 | Ebrahimi | ............... | H04L 9/3297 |
| 2019/0007215 A1 * | 1/2019 | Hakuta | ................... | G06F 21/44 |
| 2019/0021002 A1 * | 1/2019 | Kang | .................... | H04L 9/0869 |
| 2019/0058701 A1 * | 2/2019 | Wu | ........................ | H04L 9/0841 |
| 2019/0121454 A1 * | 4/2019 | Kolarov | .................. | G06F 21/64 |
| 2019/0140834 A1 * | 5/2019 | Medvinsky | ........... | H04L 9/3234 |

* cited by examiner

*Primary Examiner* — Ghodrat Jamshidi
(74) *Attorney, Agent, or Firm* — Jeffrey Pearce

(57) ABSTRACT

A digital signature is created for a data set based on a group of one-time secret keys. Revealable, representative values of the secret keys are computed, for example by cryptographic hashing, and an authentication code vector is also formed having elements that cryptographically combine each secret key with a randomizing function of the data set. The vector is timestamped and signed at a signing time. Bits of a binary representation of the signing time are used to select which of the secret values are included in a selected key vector. A signature of the digital data is then compiled to include the set of authentication code values, the signature of the authentication code vector, and the selected key vector. The secret keys thereby become unusable after the signing time.

7 Claims, 13 Drawing Sheets

US 10,511,447 B1

SYSTEM AND METHOD FOR GENERATING ONE-TIME DATA SIGNATURES

FIELD OF THE INVENTION

This invention relates to digital data security.

BACKGROUND

Now that "data" has become a normal, almost invisible, part of the lives of just about everybody in the industrialized world, focus has for many entities shifted to questions of security and integrity of the data. Central to many known solutions to issues such as security and integrity are digital signatures, that is, digital information that is associated with, and often at least partially derived from, the contents of the data set (such as a document) to be signed, and often an indication of the identity of the user/owner.

Different methods may be used to create digital signatures and verify documents. One common signature scheme uses keys that are issued by some certificate authority. The well-known Public Key Infrastructure (PKI) is an example of such a system. One problem with PKI-based signature schemes is not only the need to store and maintain the key sets, but also that PKI keys may expire, along with their underlying digital certificates. This problem is multiplied in environments in which there might be an enormous number of "perishable" key pairs associated with the many documents in circulation. Another disadvantage of PKI-based signature schemes is that they require trust of the issuing authority. Moreover, recent research indicates that some common keys may have "back doors" embedded in them, or may be generated using comprised pseudo-random number seeding routines.

Another increasing data security challenge is the ubiquity of "smart" devices such as mobile phones or items provided with "smart cards" and the desire to be able to secure and/or verify data sets that they generate or receive as well. Many known security solutions generally impose too great a computational and/or storage load on the devices, which usually have fewer and less powerful resources than, for example, a server or even laptop computer.

DETAILED DESCRIPTION

Embodiments provide a one-time digital signature method and system. Although the novel solution may be applied to any signature scheme based on an input set of secret keys, some of the embodiments provide a high degree of security while imposing a computational burden and onboard storage requirement low enough that it is feasible to implement in a smart device, even on a smart card. Compared with a known Lamport signature scheme, embodiments show a significant size improvement for not only secret and public keys used, but also the signatures themselves.

Various embodiments use time-stamping and/or digital signatures for data values or sets in some steps. Any method of obtaining a digital time value and/or digital signature may be used, and skilled programmers will know how to adapt them for use in the signature procedures.

As for timestamping, just two of many options include using the known RFC 3161 Time Stamp Server, or a time-synchronized, blockchain-based arrangement such as Bitcoin or some other blockchain. Similarly, any known digital signature arrangement may be used, including the well-known public/private key solutions. Nonetheless, because of its several advantages for both timestamping and generating digital signatures, Guardtime's KSI® system is first summarized.

The following description has three main sections: 1) A summary of the prior art Guardtime KSI® digital signature/timestamping solution, which is one option for performing these functions in some embodiments; 2) a description of the BLT Signature solution, which is novel in its own right, but may also be used as one of many options for generating a sequence of secret keys; and 3) a description of the novel Time-Selected Key (TSK) method and system.

Guardtime KSI® Timestamping/Signature Solution

A particularly advantageous signature and timestamping mechanism is the distributed, hash tree-based signing infrastructure (the "Guardtime infrastructure") provided by Guardtime AS of Tallinn, Estonia, which is disclosed in U.S. Pat. No. 8,719,576 (also Buldas, et al., "Document verification with distributed calendar infrastructure"), which is incorporated herein by reference and is marketed under the registered trademark "KSI". This Guardtime signature infrastructure (and any subsequent improvements to it) is referred to below as the "KSI system".

Figure 1:
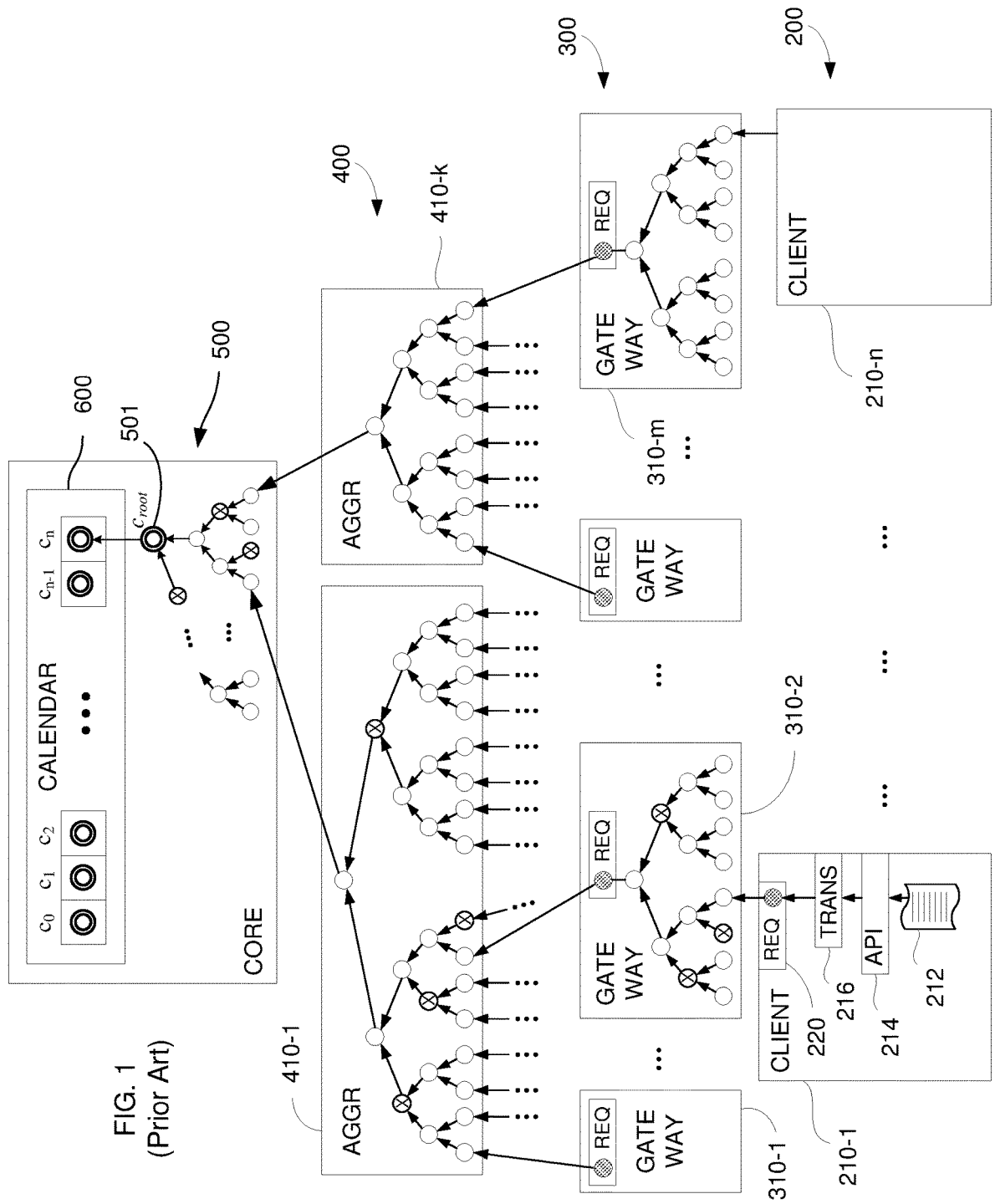
FIG. 1 illustrates the principle of a prior art KSI® data signature system.

FIG. 1 serves to illustrate how a basic implementation of the KSI system works. The general Guardtime infrastructure has several different layers: a client or user layer 200 comprising a number of client systems; a layer of gateways 300; a layer including one or more aggregation systems 400; and an uppermost layer 500 that may comprise a "core", "administrator node", etc. Typically, the gateways, aggregators and the core will be servers, with known network connections and network communication hardware and software. The various layers implement a hash tree that iteratively hashes values, usually pairwise, until a single uppermost root value is computed, and which forms the root value for all values input during the same signature period, that is, for a single evaluation of the overall hash tree.

A client may be any system where a representation of any type of information is input, created or otherwise presented (with or without human involvement) in digital form such that it can be processed and registered using the infrastructure so as to receive a signature. In the illustrated arrangement, a client is the system where digital records are prepared and entered into the verification/signature system.

Although FIG. 1 shows the various layers as being separate and distinct, some implementations of the main principles of the infrastructure might consolidate or do without some of the layers or might need to add additional layers for administrative or other purposes. A gateway in the layer 300 will typically be a computer system such as a server with which one or more of the clients communicates so as to receive requests for registration of digital records (such as documents) that its clients submit. An aggregator in the aggregation layer 400 will similarly be a computer system such as a server intended to receive registration requests that have been consolidated by respective gateways. The distinction between aggregators and gateways will often depend on which entities control each, but this is not necessary and in some implementations there is no control or functional differences between the two types of systems.

In FIG. 1, various clients are represented as 210-1, . . . , 210-n; gateways are represented as 310-1, 310-2, . . . , 310-m; and two aggregators are shown as 410-1, 410-k. An aggregator will typically communicate into a respective one of the lowest level hash tree nodes within the core, as described in more detail below. Only two aggregators are shown in FIG. 1 for the sake of simplicity; any number (including one) of aggregators may be included.

Each client system 200 that wishes to use the verification infrastructure may be loaded with or communicate with an entity that includes a software package or internal system routines for convenient or even automatic communication and submission "upwards" of digital information. The software package may include some application program interface (API) 214 that transforms submitted digital records into a proper form for processing. A digital record 212, which may be any body of digital data, including multi-element sets of data, is then submitted by way of the API 214 to a software module 216 that transforms or otherwise uses the digital data from the record 212, optionally with additional metadata and processing such as encryption, compression, etc., to create a request REQ 220 that is submitted as a value to a lowermost leaf of the hash tree infrastructure.

It is not necessary that the digital record 212 be "raw" data, although this is a possibility. Instead, a user may wish to preserve the confidentiality of such raw data and submit for signature some transformation, such as a hash, of the raw data.

Note that this arrangement for generating signature requests has at least two advantages. First, if a digital record has sensitive contents, it is not necessary to transmit them over a network and expose them to interception en route, or to reveal the contents outside of the client system itself; a user may wish to preserve the confidentiality of "raw" data and submit, as the record 212, for signature some transformation, such as a hash, of the raw data. Second, it makes it possible to sign even large files without having to transmit such large files over the network.

The data structure of a binary hash tree is illustrated within the gateway 310-2. The lowest level nodes of the gateway hash tree may correspond to the request REQ. As illustrated, the values represented by each pair of nodes in the data structure form inputs to a parent node, which then computes a combined output value, for example, as a hash of the two input values from its "children" nodes. Each thus combined output/hash value is then submitted "upward" as one of two inputs to a "grandparent" node, which in turn computes a combined output/hash value for these two inputs, and so on, until a single combined output/hash value is computed for the top node in the gateway.

Aggregators such as the system 410-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value as the result of application of a hash function that includes information derived from the digital input record(s) of every client that submitted a request to a gateway in the data structure under that aggregator.

In many cases, the core 500 is maintained and controlled by an overall system administrator. One advantage of this is that input requests will receive signatures that encode information from other, unrelated digital records as well, from completely independent sources, which then will make it in practice impossible to create fake signatures. This is not required by any implementation of KSI system, however.

Within the core, a hash tree data structure may be used compute a single root value $c_{root}$, using the root hash values of the aggregators as lowest level inputs. In effect, the hash computations and structure within the core form an aggregation of aggregation values. If only one aggregator is configured, then there will of course not be any need for aggregation within the core; alternatively, the core could in such be viewed as the uppermost aggregator. The core will therefore ultimately compute a single current uppermost core hash value $c_{root}$ at the respective tree node 501 at each of a sequence of calendar time intervals t0, t1, . . . , tn. This uppermost value is referred to here alternatively as the "calendar value" or "current calendar value" for the time interval (signature period) ti. If calendar values are computed according to precisely determined time values, such as one calendar value each 1.0 s, then each calendar value will also be a precise representation of time.

In short, each digital signature issued in a given calendar interval will intrinsically and provably be tied to a particular calendar value, and, by extension, to time, to the precision of a calendar period. Due to the essentially non-invertible nature of cryptographic hash functions, this time association will be as essentially impossible to fake as the data that led to the corresponding signature itself. The calendar value for each signature period may be stored in a data structure referred to here as a "calendar" 600 along with previous calendar values.

Note that the uppermost tree node 501 represents the root node of the entire tree structure of nodes junior to it. This will change upon recomputation of a new uppermost core hash value at the end of the next period of accumulating requests and generating signature vectors (also referred to as "data signatures") containing recomputation parameters.

The simplest KSI system signature includes an ordered vector of values that enable an entity to recompute the calendar value corresponding to a purportedly correct input. For example, in FIG. 1, a signature vector for the input 212 could include the values marked "X" in the hash tree path from the request REQ 22, up through hash tree in the gateway 310-2 and aggregator 410-1 up to $c_{root}$ and to the corresponding calendar value $c_n$.

Assume now that an entity wishes to test whether a purported unaltered version of a particular digital input record is in fact identical to the digital input record that led originally to a particular signature. The operations used to generate the original REQ may then be applied to that version, thereby forming an "initial leaf value" that can then be iteratively hashed (in the given correct order) with the values in the signature vector up to the level of the calendar value included in the signature, or, if extended, further to a composite or blockchain value (see below). If the uppermost computed values don't match, then the entity will know that the purportedly unaltered version in fact is not identical to the original.

One advantage of KSI system is that, except for possible and optional temporary establishment of user or client ID during a session, and optionally temporarily until a time of "publication" (described below), it does not rely on public/private keys. Another advantage of the signatures generated using KSI system is that they automatically and securely encode time to the precision of a calendar period.

Still another advantage of signatures generated using KSI system illustrated in simple form in FIG. 1 is that, depending on the chosen implementation, it is not necessary to submit anything back to the infrastructure itself in order to verify data given its signature; rather, assuming the hash function(s) used in the infrastructure are known, the verifying calculations can be done by any entity independently.

In some implementations of KSI system, the calendar values generated over some period (including from the beginning of system time) may be combined using a Merkle tree to produce a composite value that may be "published" in some unalterable medium or form, such as a physical or electronic medium or data structure, in print (such as a newspaper, many copies of which are widely distributed), in a widely distributed or witnessed database or web-based entry, etc. (Here, "unalterable" means that it cannot be changed without detection, that is, that the mathematical or physical difficulty of tampering with data without being detected is so great that no reasonable person would doubt the result of the verification/detection scheme.) Existing data signatures may then be "extended" to include the additional recomputation parameters from their respective calendar values up to the composite publication value. This introduces a delay until the end of the calendar period, during which user may either rely on the signatures up to the respective calendar value, or, as a temporary measure, the calendar value may itself be signed using some other known method, including known public/private key schemes. Once signatures are extended, such keys may be ignored.

Another example of an unalterable data structure in which calendar values may be stored is known as a "blockchain", which may be used to implement the calendar itself. Although the term "blockchain" itself, as well as related terms, do not yet have universally accepted definitions, typically a "blockchain" is understood as being an append-only data structure comprising a series of blocks, where each block includes data corresponding to one or more transactions, hashed together with linking data, such as a hash of all or come portion of the contents of the immediately preceding block. The chain can then be used to create a ledger, which is typically an append-only database. Once data is entered into a block of the chain, the entry is essentially irrefutable, since any tampering with the data would be reflected in the chained hash calculations and is thus easily detected.

Note that the calendar 600 itself is a form of blockchain in that it comprises a series of values, which may also be linked, directly or indirectly, cryptographically to previous values. The different calendar values are linked in the sense that any alteration of a past value will also be detectable thanks to the fact that the composite publication value may encode information from all previous blocks, that is, calendar values. Another way to accomplish linkage is to store each calendar value together with appropriate metadata, thereby forming a "block", including at least some value derived from the previous calendar value block.

BLT Signature

FIGS. 2A-3D illustrates different phases of a digital signature solution referred to here as the "BLT signature", taken from the initials of the inventors. The BLT digital signature is based on "Time-Bound Keys" (TBK) that are each used only once and are valid for only a single set time period $t_k$, such as one second. In one embodiment, the key time period $t_k$ is the same as the calendar period used for generation of KSI signatures.

Figure 2A:
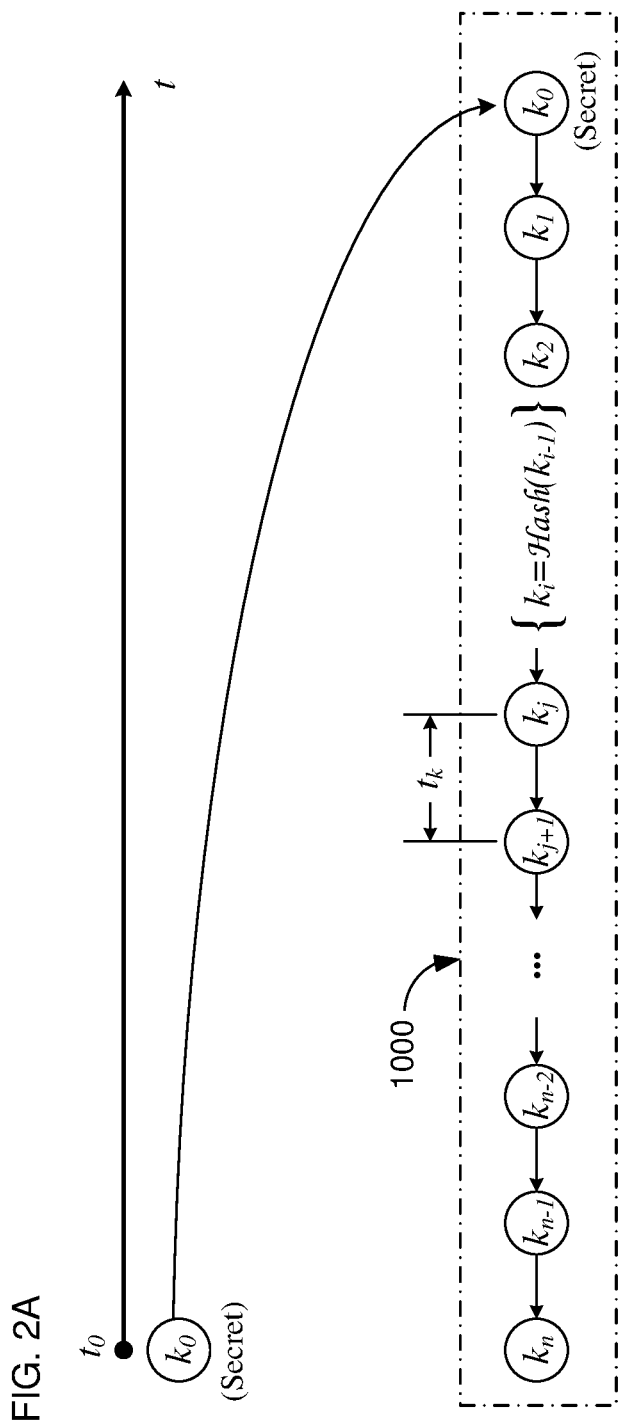
FIGS. 2A-2D illustrate different steps in a method for signing a document using novel embodiment of a system that creates "BLT signatures".

See FIG. 2A. The first operation (marked as I) is to create TBKs for an entire period during which the user expects to need them, or for some other chosen period. If the period is chosen to be, for example, a whole year, then just over 31.5 million TBKs should be generated and stored in any convenient data structure 1000. Each TBK $k_i$ is preferably generated according as $k_i = \mathcal{H}ash(k_{i-1}) = \mathcal{H}(k_{i-1})$; i=1, . . . , n, where $\mathcal{H}ash = \mathcal{H}$ is a cryptographic hash function, a common example of which is the SHA class, such as SHA-256 or SHA-512. In other words, each key is the hash of the key preceding it.

In the hash computation sequence, $k_0$ is a SECRET, a "seed", which may be chosen in any known manner. TBKs are used or made available in reverse order, however, with $k_n$ first. The TBKs may be pre-computed and stored all at once, but each TBK is attributed to a given time, starting with $k_n$ at the end of the period (such as year) and going backwards to the beginning of the period. If the key period $t_k$ is chosen to be a constant, such as $t_k$=1.0 second, then, every second from the beginning $t_0$ of TBK time, one key will become unusable. Note that, once a TBK has been used, or its corresponding time has passed, it need not be kept secret since not only is it not usable, but, due to the nature of cryptographic hash functions, it is not possible to use it or any other revealed TBK to compute the next usable TBK: cryptographic hash functions are one-way.

Figure 2B:
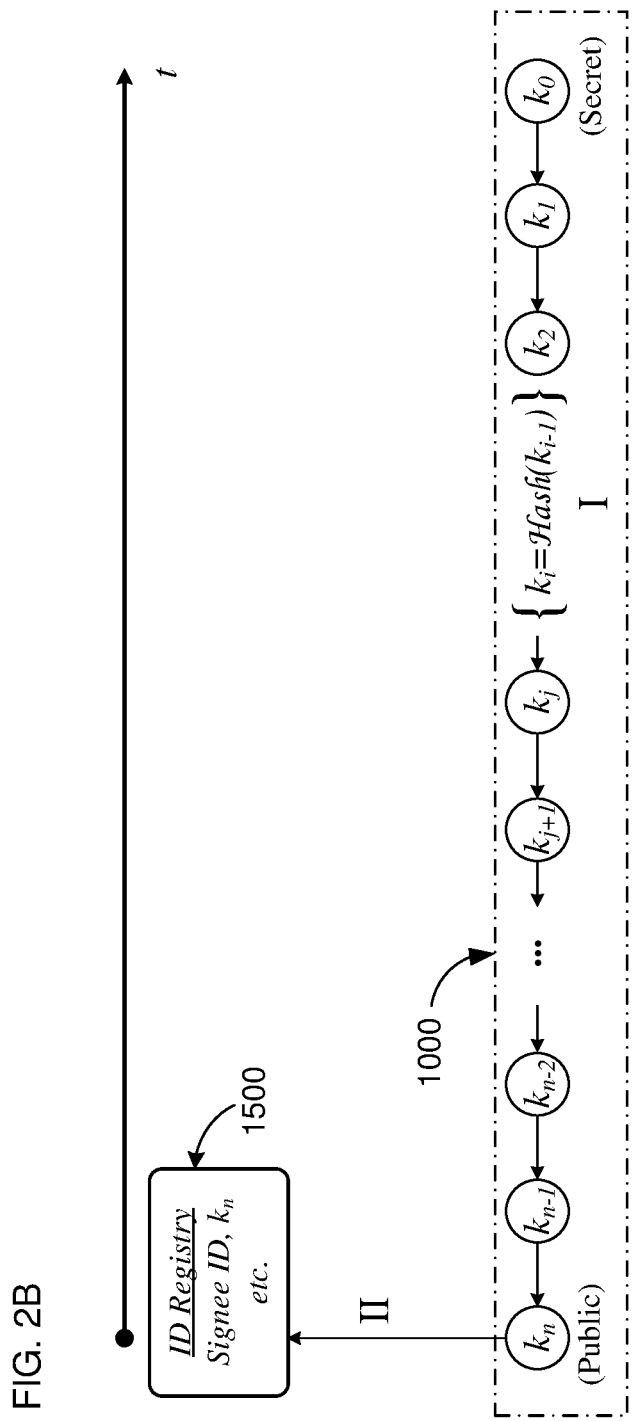

See FIG. 2B. The TBK $k_n$ may be considered as "PUBLIC" and may be stored and optionally published in any medium and data structure as an official Registry (ID Registry) 1500, associated with the ID of the owner/holder of the SECRET key (that is, the owner of the future signatures), shown in FIG. 2B as the "Signee ID". The ID Registry 1500 may also contain other desired information just as whether a SECRET key has been lost or compromised (this will be used to check the generation of signatures), meta- or administrative data such as the time and date of creation of an entry, etc.

Figure 2C:
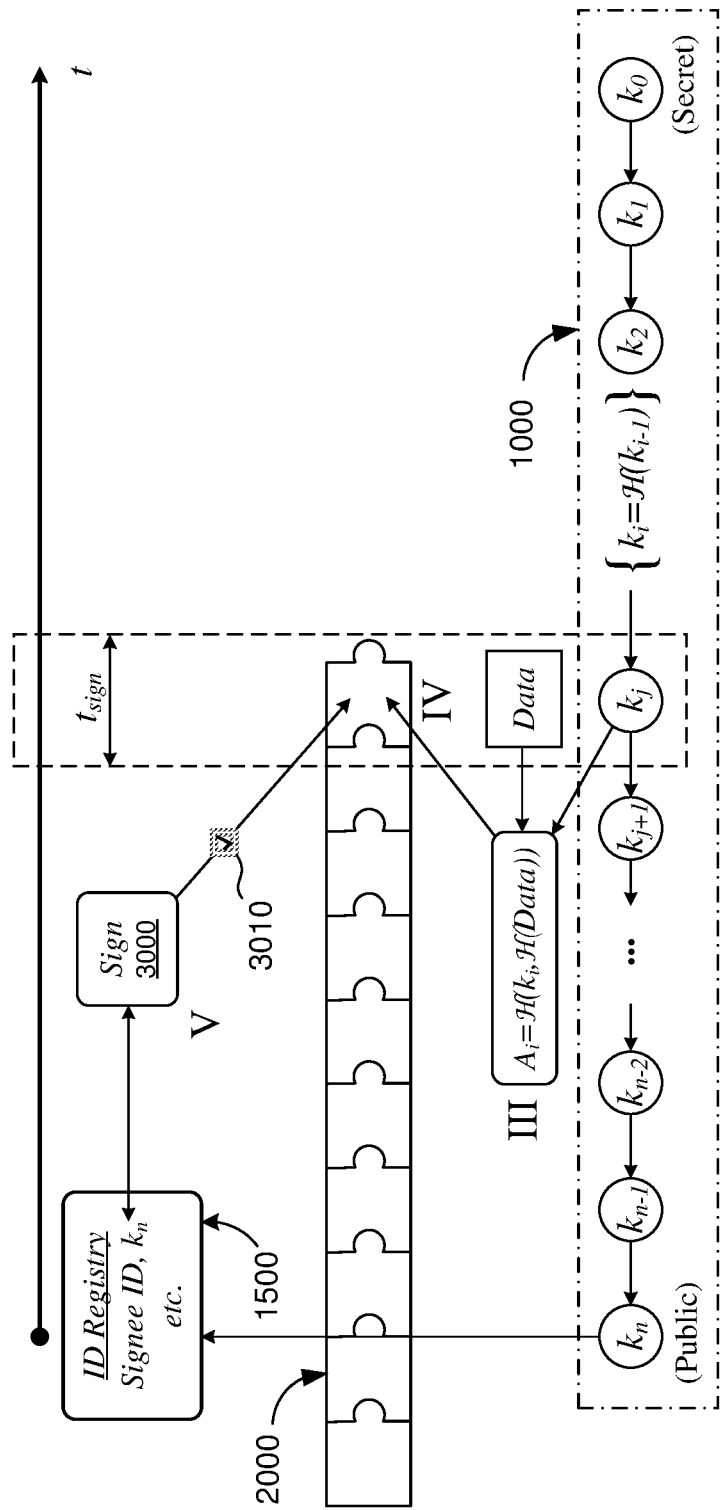
Figure 2D:
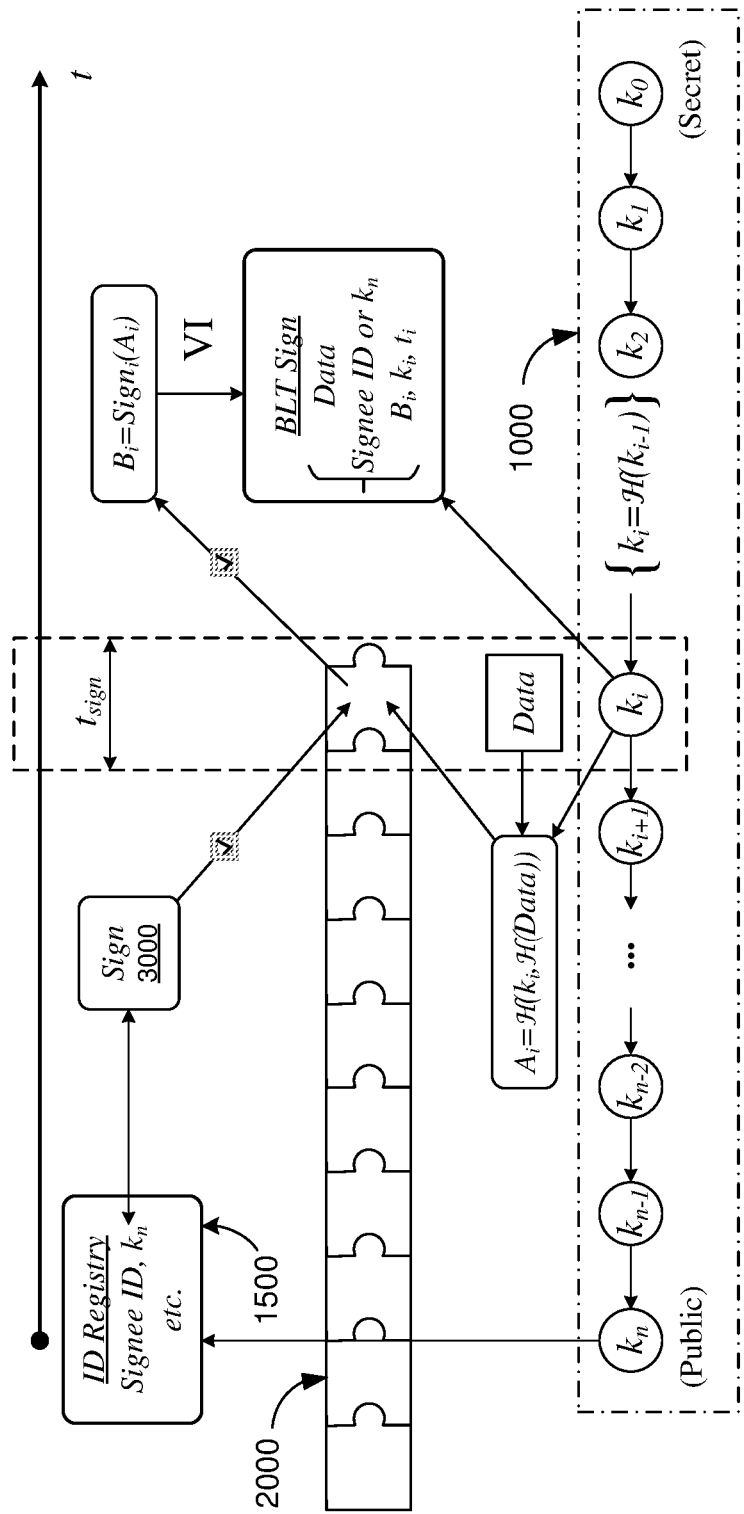

See FIG. 2C. Once the TBK data structure 1000 is created, data Data may be signed at any given signature time $t_{sign}$, which corresponds to a key period which in turns corresponds to index i. A value $A_i$ is thereafter preferably computed as $A_i = \mathcal{R}(k_i, \mathcal{R}(Data))$ where $\mathcal{R}$ is any repeatable, randomizing or at least pseudo-randomizing function. One choice for $\mathcal{R}$ may be any known Message Authentication Code (MAC), including but not limited to the known hash-based HMAC, or simply a cryptographic hash function $\mathcal{H}$ such as SHA-256, SHA-512, etc. For the sake of simplicity, and without limitation, $\mathcal{R}$ is shown below as being $\mathcal{R} = \mathcal{H}$.

$A_i$ may then be registered (IV) in a blockchain 2000. In one embodiment, the blockchain 2000 is configured as the calendar 600 in KSI system, which has the advantage that $A_i$ is irrefutably associated with time—$A_i$ becomes "timestamped" on the blockchain 2000.

The Signee (SECRET holder) may be constrained or at least allocated to a particular KSI gateway, such that the BLT signature is server-assisted. Before $A_i$ is timestamped, the KSI Gateway (which is associated to this Signee ID, through the corresponding ID Registry) may check (V) that the Signee is well-registered (indicated by a check-box 3010) and that the corresponding Public key ($k_n$) is indeed still valid (as the Signee has announced that he is using for this Signature the SECRET key corresponding to the Public key $k_n$) before issuing a signature. Note that this check solves a critical problem of standard PKI infrastructures: The validity of the Public key (and thus of the SECRET key), and thus the fact that the key has not been repudiated (or declared lost or compromised), is checked at the time of the creation of the Signature (and not at the time of checking of the Signature, at which point damage may already have been done). In this embodiment, only if all the conditions are met, $A_i$ is indeed timestamped in the KSI Blockchain. As part of timestamping, the gateway server may further check that it is well synchronized, that is, that it is indeed happening in the time $t_i$, so as to be synchronized with the right key $k_i$).

$A_i$ is the preferably signed (VI), for example using a KSI signature, and the result $B_i = Sign_i(A_i)$ may then be returned to the Signee.

A BLT Signature may then be formed to include at least the following elements:

Data

The Signee ID (and/or the PUBLIC key $k_n$)

The KSI Signature $B_i$

The time-bound key, $k_i$

The time $t_i$

Because $k_i$ (which is Secret at time $t_i$) is revealed in the BLT Signature, it is important to wait at least one second (or whatever the period $t_{sign}$ is chosen to be) before giving the BLT Signature to a third party so as to avoid this third party using the still-secret key $k_i$ during this same second $t_i$ to forge another Signature. After one second, $k_i$ doesn't need to be secret anymore, as it cannot be used anymore to sign, as $t_i$ is expired and only the next key, such as $k_{i-1}$, can be used for further signatures.

FIGS. 3A-3D illustrate different steps in one embodiment for validating a BLT signature.

Figure 3A:
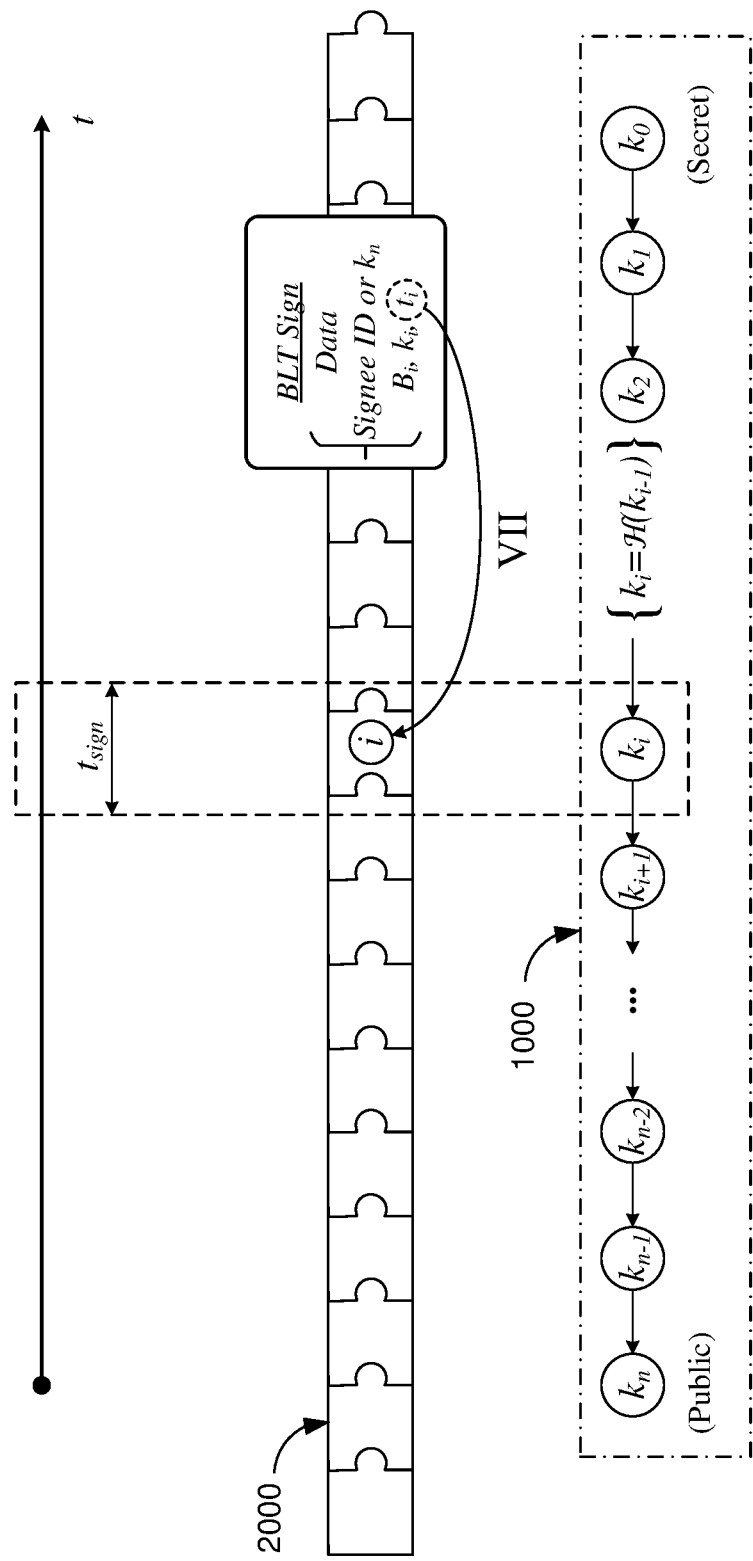
FIGS. 3A-3D illustrate different steps involved in verifying a BLT signature.

As FIG. 3A illustrates, The first step (VII) is to identify the time index i corresponding to the time $t_i$ at which the signature was generated. Blockchains are typically scannable by time, and any known technique may be used to identify the block corresponding to i. Where the KSI system is used to implementation the blockchain 2000, this will be particularly efficient, since the KSI calendar itself is also synchronized with a time base, such that a KSI signature also encodes time and functions as a timestamp as well.

Figure 3B:
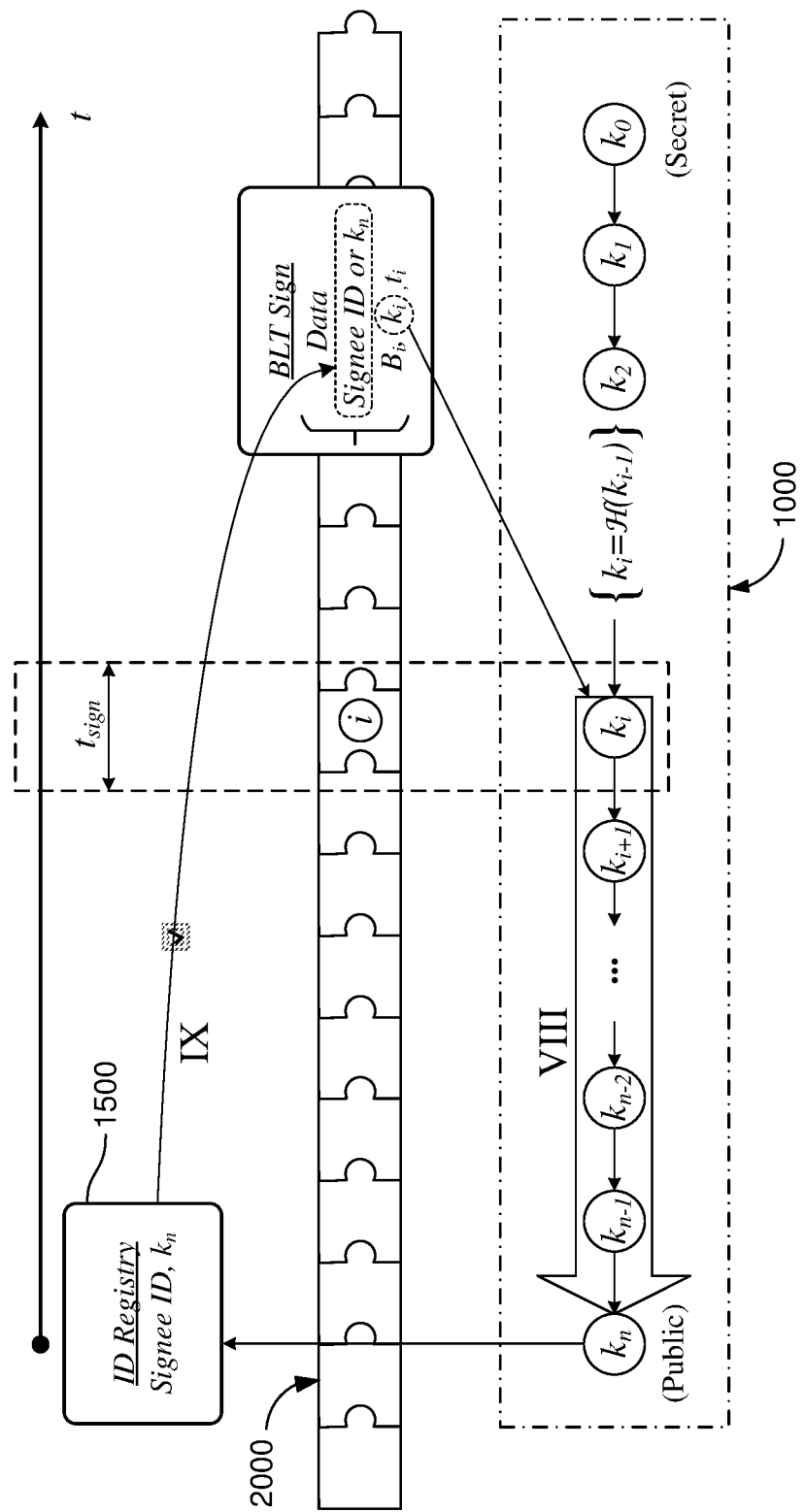

As FIG. 3B illustrates, the second step (VIII) consists in checking that the TBK $k_i$ that was used in the Signature properly corresponds to the Public key $k_n$ of the Signee (corresponding to its Signee ID). To do so, from $k_i$, the Public key $k_n$ is computed using n−i iterative applications of the hash function $\mathcal{H}$ from $k_i$ to $k_n$. Then, the obtained Public key, $k_n$, is checked (IX) in the ID Registry 1500, to confirm that it is the one corresponding to the Signee ID contained in the BLT Signature. This validation ensures that this BLT Signature has been properly issued using the SECRET key of the Signee and by nobody else.

Figure 3C:
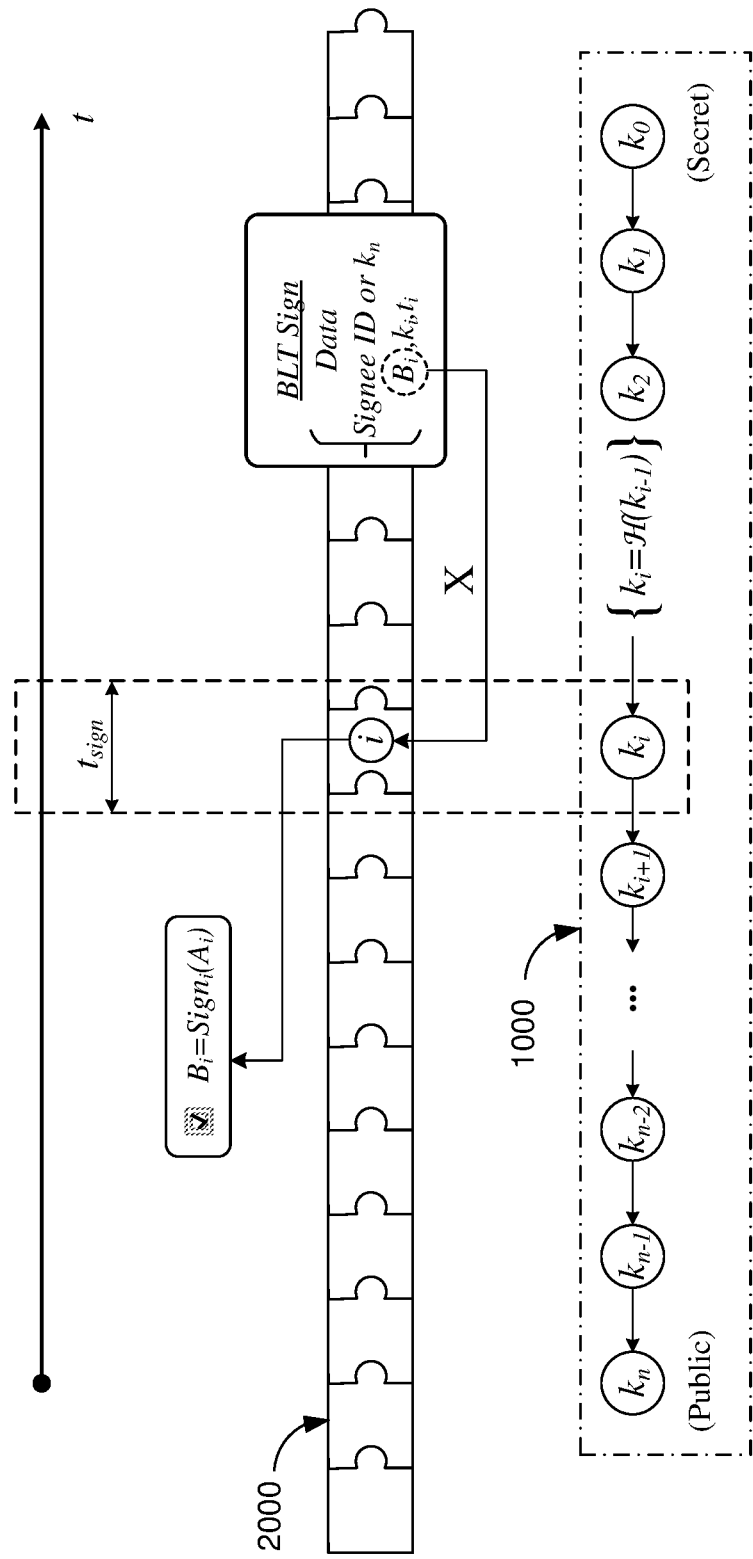

FIG. 3C illustrates a following step, in which the Signature (such as a KSI signature) $B_i$ is validated on the blockchain 2000.

Figure 3D:
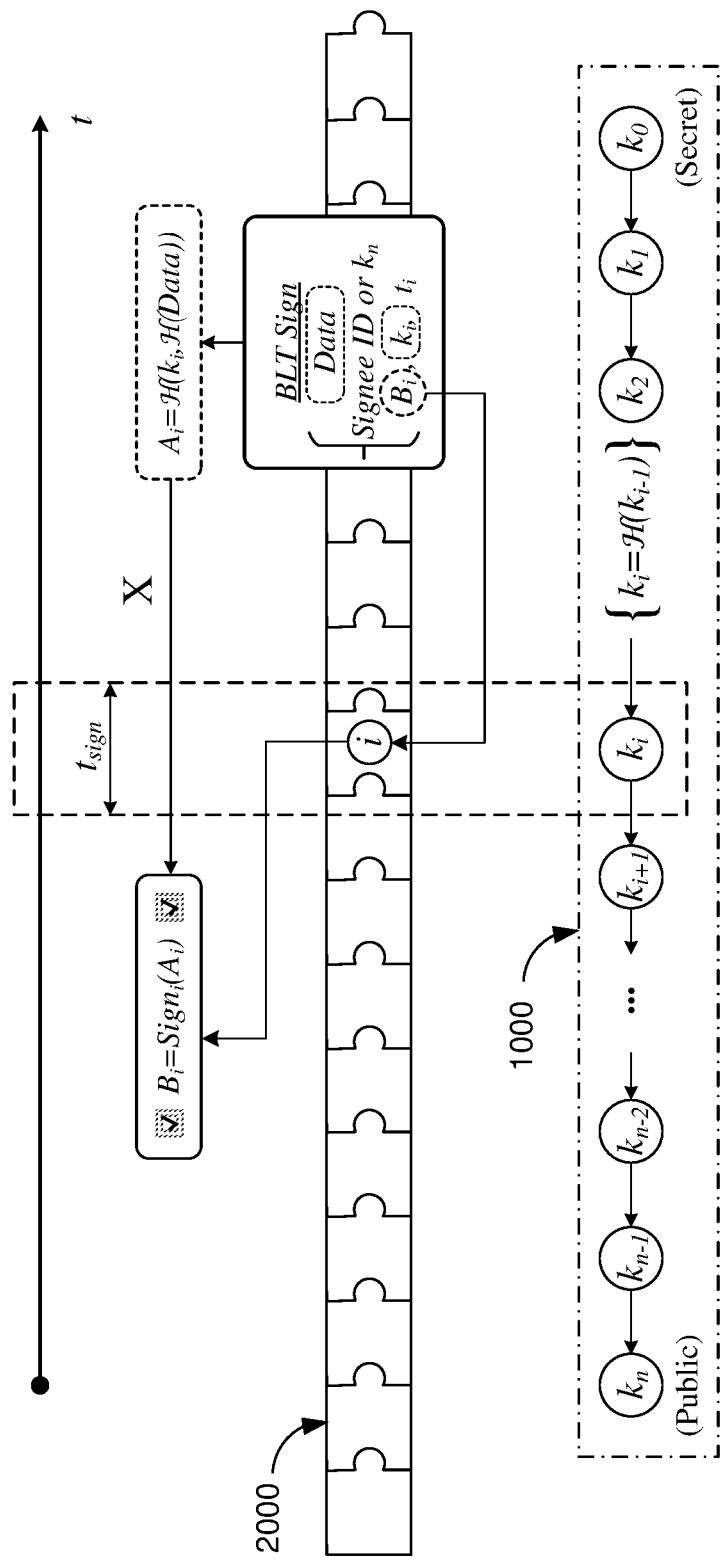

Finally, as FIG. 3D illustrates, the system checks that the [KSI] signature $B_i$ is indeed the [KSI] signature of the Data (and thus of the genuine Data). The manner in which this may be done in the context of KSI signatures is explained above; other types of signatures may be confirmed in the appropriate manner. In the KSI context, the signature $B_i$ may be checked by first recomputing $A_i = \mathcal{H}(k_i, \mathcal{H}(Data))$, and then confirming that the presented $B_i$ also satisfies the previously computed relationship $B_i=Sign_i(A_i)$. If the value does match, then it is proven that the presented data are in fact the same as the original Data signed. In summary, this procedure checks that the signed Data is genuine and that the BLT signature indeed is associated with the holder/owner of the SECRET $k_0$.

Time-Selected Keys for One-Time Signature (TSK-OTS)

Generating BLT Keys $k_i$ and Extracting Hash Chains from the Private Key to the public key may be a computationally demanding process. In a smart card the secret and public key-generating process could take several days of non-stop computation for a year's worth of private keys at one-second intervals.

Although the KSI system is synchronized to physical time, it is not necessary for KSI time to be identical to physical time; rather, time in the KSI system is typically, or can be, related to a time origin, such as the UNIX/POSIX epoch time, and represented as an integer $t=\{0,1\}^T$. To create a TSK-OTS for each document D, the user first creates T independent private keys $P=\{s_0, s_1, \ldots, s_{T-2}, s_{T-1}\}$, which are each cryptographically hashed to form a set $R=\{r_0, r_1, \ldots, r_{T-2}, r_{T-1}\}$ of respective representative values, $r_i = \mathcal{H}(s_i)$, which may be revealed any time thereafter.

One way to create the private keys is simply to choose T random numbers, using any known random or pseudo-random number generator. A particular method is to generate T recursively from a hashed chain of values from a single private seed $k_0$ as described above with reference to the data structure 1000, although the TSK-OTS method does not require any assumption of any functional relationship between the secret keys.

A public key $K_{pub}$ is then formed from the representative values. One way to form $K_{pub}$ as a vector of all of the representative values. This then requires storing all the values, in addition to the private keys, which in most cases is not an efficient use of storage space. Instead, $K_{pub}$ is preferably formed as a function that in any designed sense securely aggregates the that is, combines them functionally to form preferably a single value $K_{pub}$. (It would be possible to create multiple values that, together, perform the function of the public key, for example, by performing the aggregation on multiple subsets of the representative values, but this would add complexity with no greater, and in most cases, less security.) One example of a simple, fast, and cryptographically secure (among other characteristics, uninvertible and collision-resistant) approach to calculate the public key is to use the hash value of the concatenated representative hash values, that is, $K_{pub}= \mathcal{H}(r_0 \| r_1 \| \ldots \| r_{T-2} \| r_{T-1})$, where ∥ represents concatenation. One alternative approach is to construct a Merkle tree, where the leaves are the representative values $r_i$ and $K_{pub}$ is its root; however, this approach requires the T to be a power of 2, or a canonical shape of the tree for any expected T needs to be defined.

As its name implies, $K_{pub}$ may be made public, but in any event need not be kept secret. Furthermore, because the $r_i$ values themselves may be revealed, any entity that has them may recompute $K_{pub}$. Because of the practical non-invertibility of a cryptographic hash function, however this information will not allow a malicious actor to determine $s_i$ given $r_i$.

Now consider a "document", that is, any set or body D of digital information, including, "data" and/or metadata and/or executable code, etc., in any format. The document may be digital information that is generated within the same device that creates a signature for it, or it could be a document that the signature-creating device inputs or otherwise receives from a different source.

Let $h_{doc} = \mathcal{F}(D)$ that is, a "document function" of D. This function could be "identity", that is, $h_{doc}$ could be=D itself, and the signature methods described below would still work. It is preferable, however for $h_{doc} = \mathcal{H}(D)$, where $\mathcal{H}$ is a cryptographic hash function, and this is how $h_{doc}$ is referred to below, but it should be kept in mind that this is only by way of example. One advantage of using $\mathcal{H}$ is that $h_{doc}$ will have a set bit length, which may be much smaller than D itself. Another advantage is that if $h_{doc}$ is then revealed, the "raw" D data will still be secure. In this embodiment, to sign a document whose hash value is $h_{doc}$, T separate authentication code values are calculated using each of the private keys $$H = \{ \mathcal{R}(h_{doc}\|s_0), \mathcal{R}(h_{doc}\|s_1), \ldots, \mathcal{R}(h_{doc}\|s_{T-2}), \mathcal{R}(h_{doc}\|s_{T-1}) \},$$

where $\mathcal{R}$ is any repeatable, randomizing or at least pseudo-randomizing function. One choice for $\mathcal{R}$ may be any known Message Authentication Code (MAC), including but not limited to the known hash-based HMAC, or simply a cryptographic hash function $\mathcal{H}$ such as SHA-256, SHA-512, etc. For the sake of simplicity, and without limitation, $\mathcal{R}$ is shown below as being $\mathcal{R} = \mathcal{H}$.

H is then timestamped (preferably by obtaining a KSI signature, which also encodes time, but, otherwise, using any chosen timestamping service or routine) resulting in the signature $S_t$ with the signing time t. The value of t can be represented as a T-bit vector $t = \langle t_0, t_1, \ldots, t_{T-2}, t_{T-1} \rangle$ where $t_n \in \{1, 0\}$.

The resulting TSK-OTS signature for the document D may then be formed as $S = \{H, S_t, K\}$ where K is a selected key vector such that $K = \{s_n | \text{if } t_n = 1, \text{ otherwise } r_n, \text{ where } 0 \leq n < T\}$. As an alternative, it would be possible to form K from only the revealed secret values $\{s_n | \text{if } t_n = 1; 0 \leq n < T\}$ as long as the $r_n$ values corresponding to the non-revealed $s_n$ values $\{s_n | \text{if } t_n = 0; 0 \leq n < T\}$ are also available along with S.

Note that, compared to Lamport signatures, in this TSK-OTS scheme the number of hashing operations does not depend on the length of the hash algorithm(s) being used (for example, it does not matter if SHA-512 or SHA-256 is used—the number of hashing operations remains the same) but depends on the value T.

The value of T may be chosen according to any preferred criteria, and may comprise any number of bits in its binary representation. For the sake of a simple example, let T=8 (in practical implementations, T will be much larger, but the procedures described below will be the same).

Embodiments thus preferably use a time value that is at least synchronized with physical time (it could be actual physical time) in different ways, but there is a common advantage: Time moves ever forward, and although one can backdate or hack a purely computer-generated time or index value, one (sadly) cannot get back to past time. The time value is used not only for timestamping but also, bit-wise (or bit group-wise) for private key-selection. And then time moves on, and secrets may be revealed.

Figure 4A:
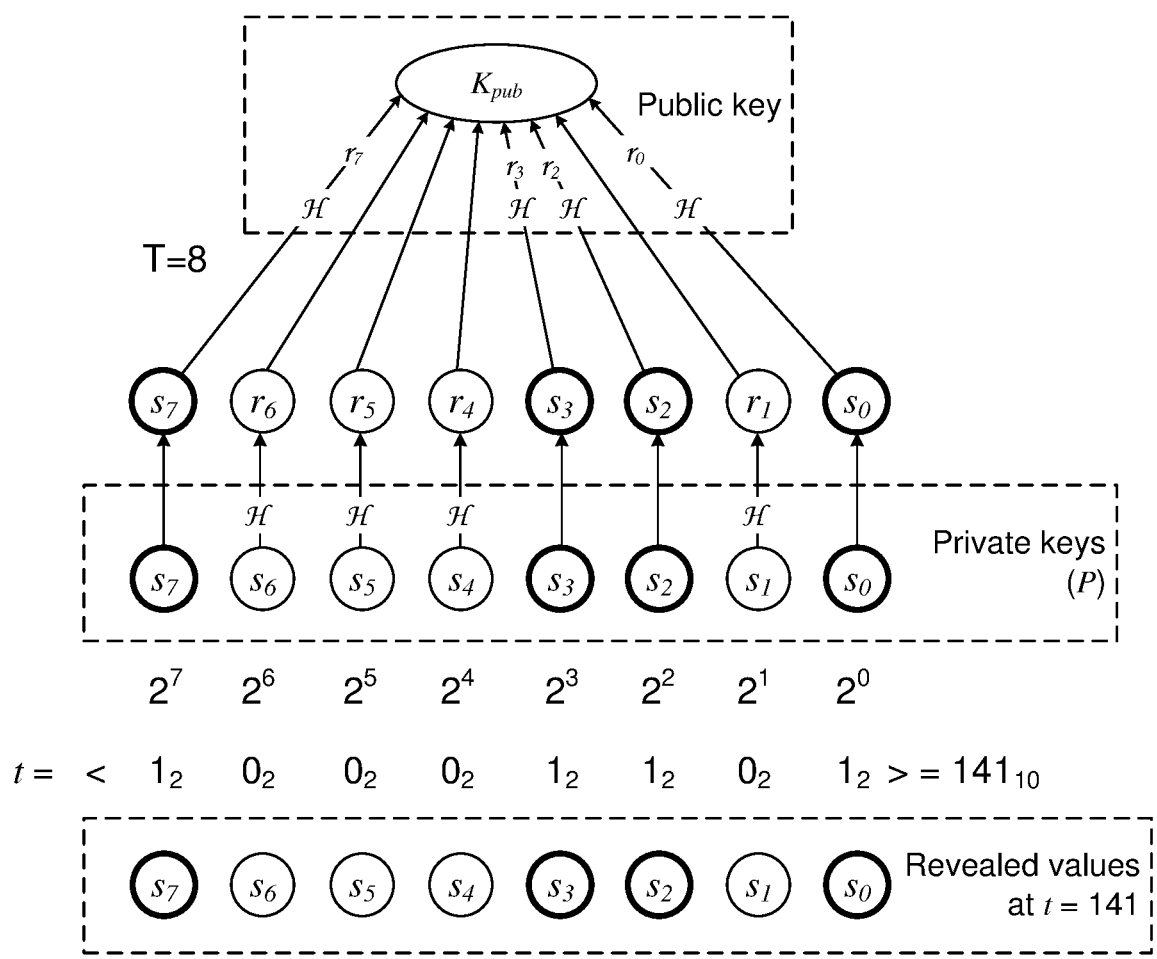
FIGS. 4A and 4B illustrate two different ways to create a public key that is used in different embodiments of the signature mechanism.

See FIG. 4A. In this example, a document D has been signed at time $t = 141_{10}$. In this case the secret keys $s_7, s_3, s_2$, and $s_0$ are revealed, since $141_{10} = 10001101_2$. Using the current set of secret keys $s_n$, the system may then compute the public key value $K_{pub}$ at time $t = 141_{10}$. For T=8, $K_{pub} = \mathcal{H}(r_0\|r_1\|r_2\|r_3\|r_4\|r_5\|r_6\|r_7) = \mathcal{H}(\mathcal{H}(s_0)\|r_1\|\mathcal{H}(s_2)\|\mathcal{H}(s_3)\|r_4\|r_5\|r_6\|\mathcal{H}(s_7))$. Note that the private keys $s_1, s_4, s_5$, and $s_6$ themselves remain secret, since only their representative values are revealed. In this example, generating the public key $K_{pub}$ takes only nine hashing operations.

Figure 4B:
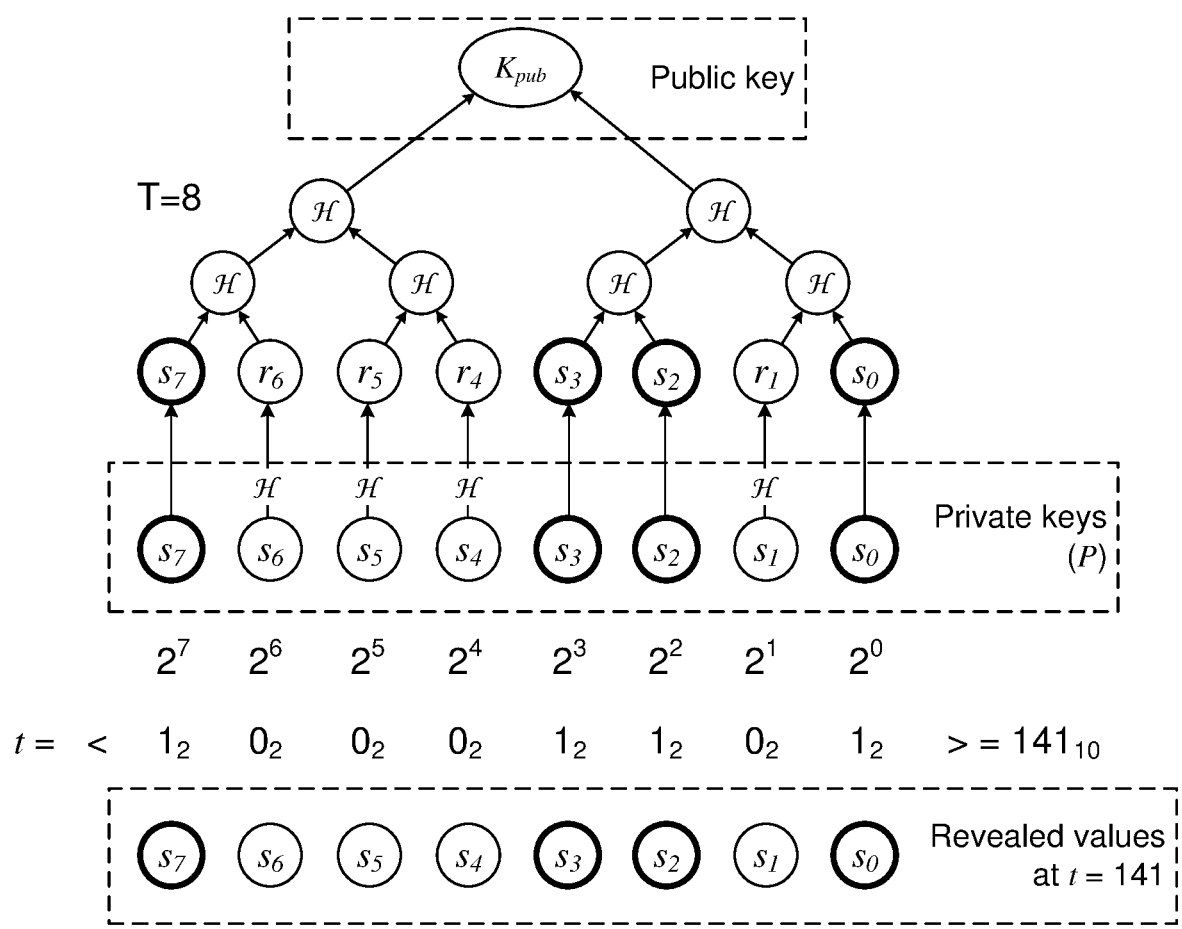

In the embodiment illustrated in FIG. 4B, the public key is created using a Merkle tree instead, in which the leaves comprise only the values $s_0, r_1, s_2, s_3, r_4, r_5, r_6, s_7$ that have already been revealed, either because the corresponding time bit $t_n = 1$, or because they are representative values $r_n$. In this embodiment, 15 hash values are needed to compute $K_{pub}$.

The following procedure may be used to verify the document D with the hash value $h_{doc}$ with the TSK-OTS signature $S = \{H, S_t, K\}$:

Verify the timestamp $S_t$. If, as is preferred, the KSI system is used to sign H and to provide the time value whose bits are used for secret key selection (such as $t = 141_{10}$ in the examples illustrated in FIGS. 4A and 4B), then the timestamp may be verified in the usual manner in the KSI system. As an alternative, $S_t$ could also be stored in any other irrefutably time-dependent data structure, such as a properly structured blockchain.

Verify H using its signature $S_t$. In implementations in which the signature is determined using the KSI system, this may be done as described above. If some other signature scheme is used, then H may be verified accordingly.

Verify every key in K using the public key $K_{pub}$. To do this, note that only some of the secret keys will be revealed at this point, but the representative values, $r_i = \mathcal{H}(s_i)$ corresponding to the non-revealed secret keys will be available to fill in the "gaps" in $K_{pub}$. Continuing with the example in FIG. 4A, $s_0, s_2, s_3$, and $s_7$ have been revealed, but $K_{pub} = \mathcal{H}(r_0\|r_1\|\ldots\|r_7)$, so values for i=1, 4, 5, and 6 are also required. But $r_1, r_4, r_5$, and $r_6$ will already have been made available. $K_{pub}$ may therefore be computed as $\mathcal{H}(\text{hash}(s_0)\|r_1\|\text{hash}(s_2)\|\text{hash}(s_3)\|r_4\|r_5\|r_6\|\text{hash}(s_7))$, such that the newly computed value should match what was originally computed directly from $K_{pub} = \mathcal{H}(r_0\|r_1\|r_2\|r_3\|r_4\|r_5\|r_6\|r_7)$.

Using every key in K and $h_{doc}$, verify the corresponding authentication code $\mathcal{R}$ values in H. Using the example, the values $\mathcal{H}(h_{doc}\|s_0)$, $\mathcal{H}(h_{doc}\|s_2)$, $\mathcal{H}(h_{doc}\|s_3)$, and $\mathcal{H}(h_{doc}\|s_7)$ should thus match the first, third, fourth and eighth values in the previously computed vector H.

Verify that the keys in K correspond to the correct signing time t. Since each key corresponds to one bit of the correct signing time, the time can be "recompiled" from the indices of the keys revealed in K. For example, with $K = \{s_0, s_2, s_3, s_7\}$, the signing time should have been $2^0 + 2^2 + 2^3 + 2^7 = 141_{10}$.

These embodiments thus produce a "TSK-OTS" signature for document D, and this signature, which may be stored in any desired data structure and format, and may be passed along with or otherwise associated with D. Others (or the original user himself) may then at any time use the TSK-OTS to verify the correctness of a purported copy of D, or to check that the original stored copy of D has not been tampered with. If tampering is detected (the signature is not verifiable given a purported correct copy of D), the user system, or any other verifying entity, may take any chosen action, including issuing failure notifications to an administrator or other entity, deleting or "locking" the incorrect copy (to prevent deletion and to help with forensic analysis) or even issuing an instruction to the operating system component (or equivalent) in the device itself to lock or otherwise disable a user's ability to alter relevant aspects of the state of the device, etc. Note that failure detection may occur at any of the different steps of the verification process. The embodiments thus generate elements of a data structure that refer back to the data structure itself, which together with a purportedly correct version of a document D, may be used to verify or refute the correctness.

The various values that are revealed after signature of a document may be either stored in a central verifying entity, such as a server, to be queried for verification by a recipient of a document D, or could be passed along with copies of D for remote and independent verification. Because of the compactness of the signature and the efficiency of computing it, devices as small as existing smart cards and mobile phones may have the corresponding executable code and signature-related values embodied in internal storage, for execution using their processors, which will typically be much less powerful than, say, a server, and whose storage capacity is also much less than more general purpose computing platforms.

Figure 5:
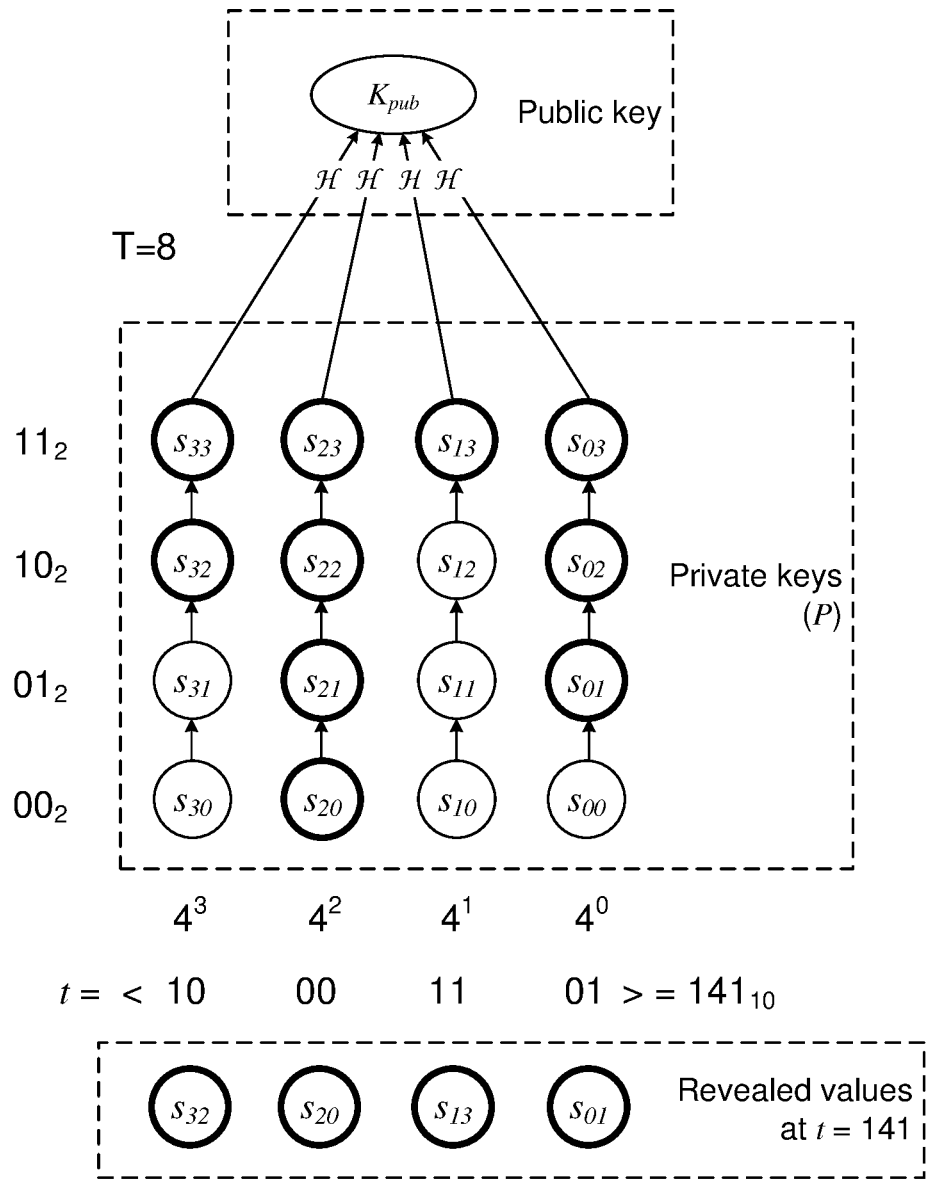
FIG. 5 illustrates a different method for creating a public key used in signing a document, in which a time value is grouped in tuples, each of which is used to select which of chains of private keys to reveal.

See FIG. 5. In another embodiment, a variation of the known Winternitz signature scheme may be used to reduce the size of the signature by considering the time component bits in tuples, such that only T/2 initial secret values P=<$s_{00}$, $s_{10}$, $s_{(T/2-1)0}$> will be needed. For convenience, this embodiment is abbreviated here as TSK-W-OTS. For every secret key in P, in this embodiment, the hash values $s_{i3}$=hash$(s_{i0})^3$ are calculated, that is, sets of four values are computed by three iterations of hashing of the respective initial value $s_{i0}$, thereby forming separate "reduced" hash chains. For example, in the example shown in FIG. 5, $$s_{03}=\text{hash}(s_{02})=\text{hash}(\text{hash}(s_{01}))=\text{hash}(\text{hash}(\text{hash}(s_{00})))$$

The values $s_{i3}$ are then used for calculating the $\mathcal{R}$ values, along with the input hash value $h_{doc}$. Thus, in this example, $\mathcal{R}$ ={$r_0$, $r_1$, $r_2$, $r_3$}={hash($s_{03}$), hash($s_{13}$), hash($s_{23}$), hash ($s_{33}$)}. When the signature has been timestamped, the pre-images of the keys can be revealed based on the value of the binary tuples of the time value. Using this embodiment, depending on the length of the revealed hash chains, the system can compute and verify the time value using powers of 4. Note, as with the embodiments shown in FIGS. 4A and 4B, that even if an attacker were to try to reduce the time value, this would require backdating of the timestamp, and such attempt would either fail or be detectable if, for example, the KSI system is used to provide the timestamp.

Consider again an example in which T=8. FIG. 5 illustrates how the public key may be computed from the private keys $s_{00}$, $s_{10}$, $s_{20}$, and $s_{30}$ and which keys are revealed when the signing time t=$141_{10}$=$10001101_2$. In this embodiment, the time value bits are grouped in twos—here, (10)(00)(11) (01)—, each group indicating which value in the iterated hashing sequence $s_{i3}$=hash$(s_{i0})^3$ is to be revealed. Thus, for the sequences starting with $s_{i0}$ (i=3, . . . , 0), the tuple indicates the value of i. Thus, because $(10_2)(00_2)(11_2)(01_2)$=$(2_{10})(0_{10})(3_{10})(1_{10})$, keys $s_{32}$, $s_{20}$, $s_{13}$, and $s_{01}$ are revealed for time t=$141_{10}$.

The key values that are either revealed outright or can be computed knowing the revealed keys are indicated in FIG. 5 with "bolded" circles. Thus, for verification, $s_{13}$ can be used directly in the re-calculation of $K_{pub}$ (after hashing, to obtain the corresponding representative value $r_1$). On the other hand, $s_{32}$, $s_{20}$ and $s_{01}$ would need to be hashed one, three, and two times, respectively, to get the corresponding values $s_{33}$, $s_{23}$ and $s_{03}$ that can be submitted for re-computation of $K_{pub}$.

Of course, the choice of bit order, which bits each tuple selects, and even the method of bit grouping is a design choice; what's shown in FIG. 5 is simply one choice, by way of illustration, for the illustrated case of T=8.

Generating the public key as in the FIG. 5 example reduces the signature size to half of the original (FIG. 4A), at the cost of a greater number of required hashing operations, in this case, 13, with a corresponding increase in the number of hashing operations needed to verify the signature. The private key size also increases if stored or additional hashing operations are needed before HMAC values can be calculated.

In the example illustrated in FIG. 5, time bits are "grouped" into 2-tuples. As mentioned above, it would be possible to use other n-tuples. For larger "bit groups", that is for n-tuples where n>2, although possible as design choices, issues of scalability may arise. For example, when n=4, the hash chains from each secret value would need to be 16 elements long, and, in the example of T=8, there would need to be two them. This is already more hash operations than 13.

Another approach to reduce the size of the signature would to fix the time t=0 to a more recent date individually for every key pair or aggregated set. The start time should then preferably be hashed into the public key. The current UNIX/POSIX time representation already uses 31 bits and will reach 32 bits in 2038. With a year lasting just under 32 million seconds, a key supply for a year would need to cover 25 bits, which would mean roughly a 20% reduction in the signature sizes.

Other embodiments may implement various other optimizations, some of which reflect a trade-off choice between key size and computational burden. If increasing the private key size is not an issue, the number of hashing operations during signing can be reduced. Instead of calculating the representative hash values $r_i$ for the private keys, the $r_i$ values themselves may be stored alongside the private keys $s_i$. The value H may then be calculated as H= $\mathcal{R}$ ($h_{doc}$, $r_0$, $r_1$, . . . $r_{T-2}$, $r_{T-1}$)=(for example) hash($h_{doc}$, $r_0$, $r_1$, . . . $r_{T-2}$, $r_{T-1}$). After time-stamping H, the representative values $r_i$ or the secret keys $s_i$ can be disclosed. The signing process would in this embodiment require only a single hashing operation.

In yet another embodiment, if the secret keys are generated from a common seed (chosen in any known manner) using any known randomizing or pseudo-randomizing function $f$, for example $s_i$=$f$(seed, i), the private key could consist of the seed and the representative hash values ($r_i$=hash($f$(seed, i))). The function $f$ is not limited to, but could be, a hash function. When a secret key $s_1$ needs to be disclosed, only this value $s_i$ needs to be calculated (for T=32, on average 16 additional (hashing) operations; maximally 32 (hashing) operations and minimally 0).

This will increase the private key size by the seed size, double the hashing operation count for public key computation, but, for signing, requires maximally the same amount of hashing operations, but, on average, is faster than the approach illustrated in FIGS. 4A and 4B. Note that this embodiment may not in fact require a doubling of (hash) operations in the public key calculation since, even in the earlier described embodiments, secret keys $s_i$ have to be generated in the first place—unless the device has a dedicated random generator, it will be a common design choice to generate $s_i$ using a common seed and a function $f$ anyway. If so, the approach increases only the size of the private key and on average reduces the computational amount while signing.

In some situations, one-time signatures are not practical due to the need to frequently publish a new public key. This can be overcome by using Merkle signatures, which can be used to combine arbitrary one-time signature public keys into one. Different embodiments provide different alternatives for build the public key for signing a limited number of documents.

In the first such embodiment, the builds a Merkle tree with T*n leaves, where n is the number of documents that can be signed. When a document is signed, the private keys with the indices $<i*T, i*T+1, \ldots, i*2*T-1>$ are used, where $0 \leq i < n$ and i is the index of a set of secrets that have not yet been used to sign a document. The secret key $s_x$ represents the value $2^{x \bmod T}$, where x is the index of the representative leaf hash in the Merkle tree. The inequality $i*T \leq x \leq i*2*T-1$ should hold true when the signature is verified; otherwise, given enough valid signatures, an attacker could forge a signature for a future time and only has to wait for the correct signing time. Generating the public key in this embodiment takes $C_n = n*m + 2n - 1$ hash computations, where m is the number of hash computations needed to generate a single (n=1) one-time key.

Assume that a smart card can perform around 100 hash calculations per second. In such a case, generating the public key for 100 keys would take around 102 seconds. This scheme would increase the public key size n times (unless only the root hash is published and the signing device is made responsible for providing all of the hash chains to the root hash). An alternative is to construct the secrets themselves as trees. When signing a document, the i-th leaf of every secret should then be used. The signature verifier must then make sure that all of the published keys in the signature have the same index in their own subtrees. This approach has the benefit of a constant size public key, but increases the computational complexity of the signer, which has to provide the hash chain from each of the secrets to the public key.

In order to reduce the number of hashing operations needed to generate the public and private keys even further, a different embodiment uses a hierarchical approach. Instead of creating a single tree of keys, in this embodiment the tree is divided into layers, where the top level tree is used to sign the root nodes of the next level, and so forth. The root of the top level tree is the public key and the leaves of the lowest level are the actual signing keys. With this approach, only one tree per level needs to be calculated. As soon as one tree (except the top level tree) is depleted, another can be calculated (or the tree can be calculated in parallel while the tree is being used, to distribute the computational overhead evenly).

In an initialization phase, a single KSI signature is sufficient, as all of the layers can be signed all at the same time. As new trees are being created and signed with its parent, however, the system will attach an individual KSI signature to each of the layers. Let L be the number of layers used and every tree can sign n times. The number of hashing operations for the initialization phase would be $C_{L,n} = L * C_n$. This approach has the capacity for $n^L$ signatures. The cost of this scheme is the need to store the same number KSI signatures as there are layers. The KSI signatures should also be included in the final signatures themselves, making them notably larger. For example, to generate $2^{20}$ keys, we would require $C_{2,20} = 2^{20}m + 2*2^{20} - 1$ hashing operations. For m=13 hashes, this would take about 5 days to complete on a device that can do 100 hashes per second.

If four layers are generated, where each of the trees has 32 leaves, this embodiment is capable of generating $2^{20}$ signatures, but the initialization would require $C_{4,32} = 4*32*m + 2*32 - 1 = (2^{13} - 1)*m$ hashing operations. Using the same parameters, the process would take about 18 minutes. Using five layers with trees with 16 leaves each would take about 6 minutes.

A slightly optimized way to construct the hierarchy is to use only two layers (or the bottom two layers) and only the full time value (for example, 32-bit) for the upper tree. All the children of that tree can then be interpreted as (shorter, for example, 16-bit) time increments for the parent time. In other words, the lower level TSK-OTS signature will be shorter (half in the given example) and would also need a timestamp. Although with this method both layers still need a time-stamp, the resulting signature would be slightly less than double in size (512 bytes for the given example). Note that the second-level keys will expire automatically when more time passes than can be expressed when combining the full time of the parent signature time-stamp given the increment. When parts of the lower tree have already been used, it should not simply be re-signed with a new parent key, as this would open the door for forged signatures; however, a sub-tree of leaves that have not been used may be salvaged and re-signed. In order to waste as few unused keys as possible, a dedicated tree structure may also be included. Alternatively, the forest of the unused sub-trees keys could be aggregated back into a smaller tree instead of recalculating the whole tree from scratch.

Embodiments described above may be compared quantitatively with each other, and with the well-known Lamport signature scheme. For practical purposes, based on the 32 bit Unix time, assume T=32 and the hash algorithm used is SHA-256. Using these parameters, the public key size would be 32 bytes (the length of the hash algorithm) and the private key size would be 1 KB (T*32 bytes). For every private key, a representative hash is calculated, which will take $32*m_h$ amount of time, where $m_h$ is the time needed to calculate one hash value.

Additionally the public key has to be calculated, which takes an additional 1 hashing operation. Thus, calculating the public key takes $32*m_s + 33m_h$ units of time, where $m_s$ is the time needed to create each secret key. If one approximates that $m_s = m_h$ (a secret key could be calculated as $s_n = \text{hash}(\text{seed}\|n)$, where n is the index of the secret) then generating a public key would take $65*m_h$ units of time. This means the public key could be calculated under a second in an smart card that is capable of doing about 100 hashing operations per second. The size of the signature depends on the size of the timestamp, plus 1024 bytes (mix of revealed private keys and representative hash values).

In Table 1, the TSK-OTS and TSK-W-OTS embodiments are compared with the known Lamport signature scheme. Of particular note is that both embodiments significantly reduce both the public and private key size and require far fewer hashing operations to generate the public key. The Lamport scheme does require fewer (that is, no) hashing operations for signing a document, but the computational burden of both embodiments is still substantially negligible in practice, in a smart card implementation.

TABLE 1

|  | TSK-OTS (T = 32) | | TSK-W-OTS (T = 32) | | Lamport Signature | |
| --- | --- | --- | --- | --- | --- | --- |
|  | SHA-256 | SHA-512 | SHA-256 | SHA-512 | SHA-256 | SHA-512 |
| Private key size | 1024 B | 2048 B | 2048 B | 4092 B | 16384 B | 65536 B |
| Public key size | 32 B | 64 B | 32 B | 64 B | 16384 B | 65536 B |
| Hashing ops to generate public key | 33 | 33 | 49 | 49 | 512 | 1024 |
| Signature size | 1024 B* | 2048 B* | 512 B* | 1024 B* | 8192 B | 32768 B |
| Hashing ops for signing | 32 | 32 | 16 | 16 | 0 | 0 |

*Excluding the size of a KSI signature (if used), which is approximately 2.5 KB, which can be reduced to roughly 1 KB by removing the calendar hash chain, publication/calendar authentication record and relying on online verification.

Once a signature has been generated for a document, the two may be stored in association with each other in any preferred data structure, and/or may be sent to a recipient, who will then have the information needed for verification. It would also be possible to automate verification for some use cases, such as by including a verification module along with an email application, word processor, etc., which, for example, verifies that an incoming document is authentic before allowing a user to open it. The verification module could be run in a separate, secured application space, such as a virtual machine, to help prevent infection by any malware or viruses that may have been inserted into an allegedly authentic version of the document.

Figure 6:
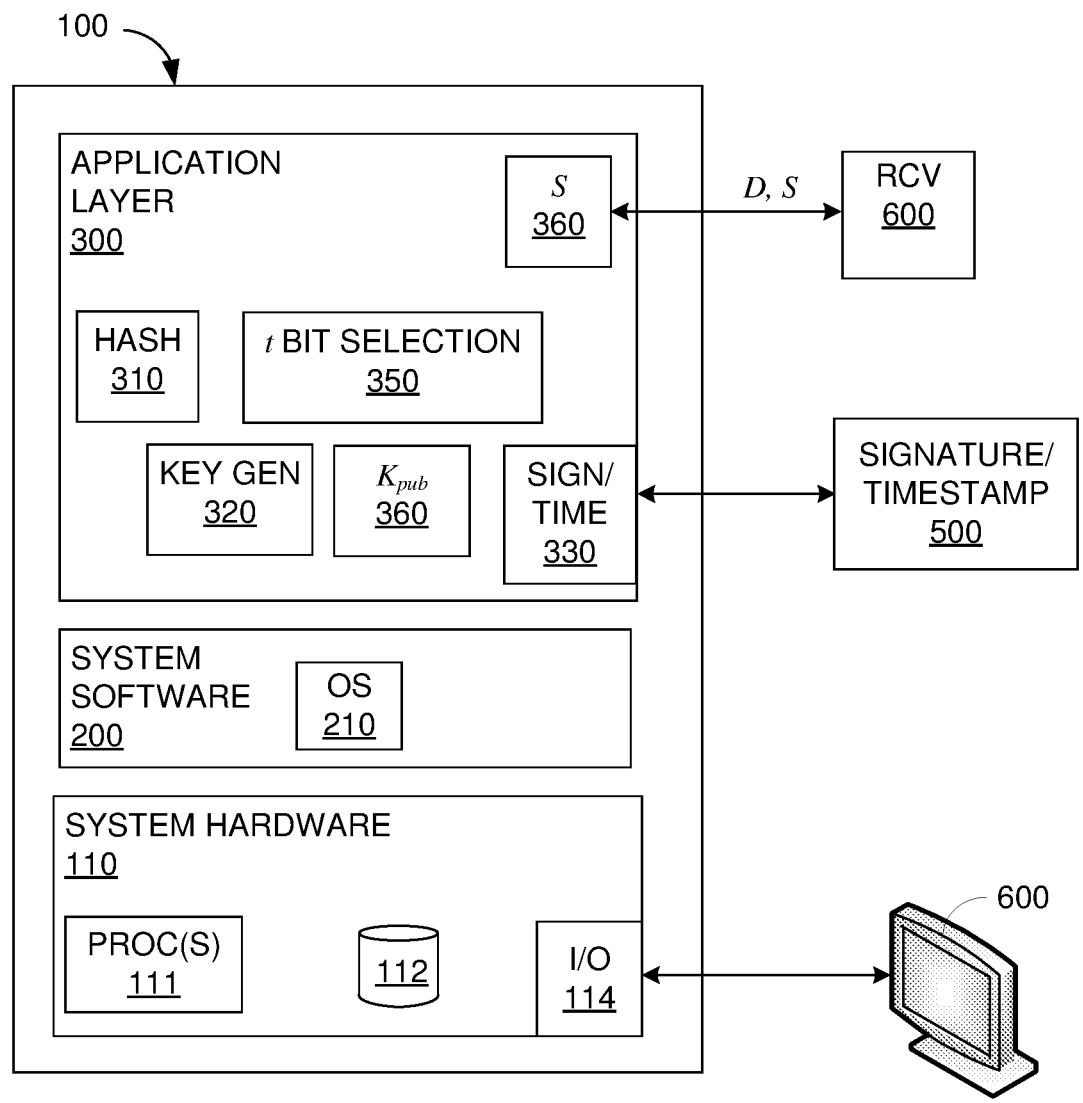
FIG. 6 shows the main hardware and software (if implemented) component and module of a system for generating digital signatures.

FIG. 6 illustrates the main hardware and software components of a device 100, such as a smart card, smart phone, or even a "full power" device such as a laptop or tablet computer or even a server—although embodiments of the invention are particularly well-suited for devices with relatively less storage capacity and processing power, the invention may of course be used to advantage in larger and more powerful devices as well.

In general each device 100 will include standard components such as system hardware 110 with at least one processor 110, some form of system software 200 such as an operating system 210 and/or virtual machine hypervisor, as well as volatile and/or non-volatile memory and/or storage, which is indicated "collectively" as component 112. The various data structures described herein, as well as the processor-executable code created to embody the software modules used to carry out the various functions illustrated in FIGS. 2A-5, may be stored and thus embodied in either or both types of memory/storage components. Especially given the proliferation of high-speed "non-volatile" storage components, the difference between these two component classes is becoming less relevant.

The various data sets and data structures, such as the hash chain 1000 (if used), the registry 1500, the private keys $s_i$ and their representative values $r_i$, as well as the various intermediate computation values, hash tree data structures such as illustrated in FIG. 4B, the hash chain values shown in FIG. 5, data signature, and the current time value used for bit selection, etc., may be stored in any desired format in the component 112.

Standard I/O access components 114 may also be included in each device to enable communication with external devices and systems. In implementations in which the device is a smart card, the access component 114 may be the pads and signal conditioning hardware and firmware used to communicate with a smart card reader. In other cases, as appropriate, the component 114 may be a network access component such as a NIC, or any known wireless communications component such as Bluetooth, RFID, NFC, etc., for communicating with external systems, for example, to transfer a document along with its TSK signature.

One or more entities may also include or connect to and control a display 600, with corresponding conventional drivers, etc.

In implementations in which the device is a smart card or similar "low-capacity" device, the executable code that embodies and performs the various computations and other functions used in the invention may be wholly or partially "firmware" or even encoded to be fixed by hardware, although this is just one option. Modern smart phones, for example, typically have more than adequate storage and computational power to generate and store enough secret keys for a year or more, and to perform the other functions associated with signing a selected document D.

A timestamping server or service 500, which may be of any chosen type, such as a KSI gateway server, an RFC 3161 server, etc., is also included.

FIG. 6 shows the device 100 as including an application layer 300, which comprises various software modules for performing the functions described above to sign a document. Such an application layer is usually distinguished from the system software layer in that system software operates in a privileged mode with respect to its interaction with system hardware whereas "applications" don't. Especially in implementations in which the device is a smartcard or the like, this distinction may not apply. Thus, that the various modules shown within the "layer" 300 is for purpose of illustration.

A hashing module/component 310 may be included directly in the device 100 in order to cause the processor (or a dedicated co-processor if included) to compute hash (or MAC or other randomizing function) values. A key generation module/component 320 is included to generate the private keys, either as a functionally unrelated set of values, or using a hash chain or random number generator from a seed, or in any other manner the system designer has chosen. A A signature module/component 330 communicates with the signature and timestamping system (which could be separate systems) 500 to obtain a current time value. A bit selection module/component 350 may then input this time value and select which of the private keys are to be revealed at the given signing time. A component 360 may then be included to compute the public key $K_{pub}$.

A signature generation module/component then, calling other modules as needed, then computes and compiles the signature (BLT, TSK-OTS, TSK-W-OTS, depending on the implementation) S that may then be associated with and sent to a receiving system 600, if the document D is to be sent to it. Such a receiving system will include conventional hardware and software components, as well as the modules, similar to those in the device, to perform the verification functions described above, which may also include interacting with the signature/timestamping server 500.

An or all of the modules/components shown in the layer 300 may of course be combined into one, depending on programming preference.

What is claimed is:

1. A method for verifying the authenticity of a digital data set D comprising:
   selecting a plurality T of secret values;
   for each secret value, computing a representative value as the output of a randomizing function;
   computing a public key from the representative values;
   computing a document function value of the digital data set;
   compiling a set of T authentication code values by computing each authentication code value as an at least pseudo-randomizing functional combination of the document function value and a respective one of the secret values;
   timestamping the set of T authentication code values at a signing time t said timestamping being synchronized with physical time, and compiling a time vector having elements corresponding to binary bits of a digital representation of the signing time;
   digitally signing the set of authentication code values at the signing time t to yield a first signature;
   compiling a selected key vector having a plurality of elements, each element being a respective one of the secret values when the corresponding respective element of the time vector has a first binary value; and
   forming a signature of the digital data set to include the set of authentication code values, the first signature, and the selected key vector.

2. The method of claim 1, further comprising setting each element of the selected key vector for which the respective element of the time vector has a second binary value to be the corresponding representative value of the respective secret value.

3. The method of claim 2, in which the step of computing the public key comprises computing the public key as a root of a binary hash tree having leaf values formed from the secret values for which the respective element of the time vector has the first binary value and the representative values for which the respective element of the time vector has the second binary value.

4. The method of claim 1, in which the step of computing the public key comprises computing the public key as an aggregation of the representative values.

5. The method of claim 4, in which the step of computing the public key comprises computing the public key as a single hash function having the representative values as input parameters.

6. The method of claim 1, in which the step of digitally signing the authentication code values first signature comprises submitting the authentication code values as an input to a hash tree infrastructure system that has a plurality of digital input values, said first signature including values enabling recomputation upward through the hash tree infrastructure to a root hash value at a calendar period that corresponds to the signing time t, such that the first signature also acts as a timestamp for the set of authentication code values.

7. The method of claim 1, further comprising generating the secret values from a common seed value.

* * * * *